US011936127B2

(12) United States Patent
Tanaka et al.

(10) Patent No.: US 11,936,127 B2
(45) Date of Patent: Mar. 19, 2024

(54) CONNECTOR AND CONNECTOR ASSEMBLY

(71) Applicant: Molex, LLC, Lisle, IL (US)

(72) Inventors: Daiki Tanaka, Yamato (JP); Naoto Sasayama, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/485,519

(22) Filed: Sep. 27, 2021

(65) Prior Publication Data

US 2022/0013941 A1 Jan. 13, 2022

Related U.S. Application Data

(63) Continuation of application No. 16/857,185, filed on Apr. 24, 2020, now Pat. No. 11,158,968.

(30) Foreign Application Priority Data

May 8, 2019 (JP) ................................ 2019-088277

(51) Int. Cl.
*H01R 12/71* (2011.01)
*H01R 13/516* (2006.01)
*H01R 13/631* (2006.01)

(52) U.S. Cl.
CPC ......... *H01R 12/716* (2013.01); *H01R 13/516* (2013.01); *H01R 13/631* (2013.01)

(58) Field of Classification Search
CPC .. H01R 12/716; H01R 13/516; H01R 13/631; H01R 13/20; H01R 12/73; H01R 13/56;
(Continued)

(56) References Cited

U.S. PATENT DOCUMENTS 4,969,842 A * 11/1990 Davis ................... H01R 12/714 439/931
8,845,339 B2 * 9/2014 Ono ..................... H01R 12/712 439/74

(Continued)

FOREIGN PATENT DOCUMENTS

CN 103155292 A 6/2013
CN 104377484 A 2/2015

(Continued)

OTHER PUBLICATIONS

Non Final Rejection received for U.S. Appl. No. 16/857,185, dated Feb. 25, 2021, 09 Pages.

(Continued)

*Primary Examiner* — Abdullah A Riyami
*Assistant Examiner* — Nader J Alhawamdeh

(57) ABSTRACT

A connector body includes mating guide parts having mating recesses into which counterpart mating guide parts are inserted, the reinforcing bracket includes a body part attached to end wall parts of the mating guide parts, and a pair of left and right connection arms connected to both ends of the body part, the connection arms extending to the longitudinal center of the connector body and being attached to side wall parts of the mating guide parts, the connection arm includes a side plate part and a side wall upper cover part connected to an upper end of the side plate part, at least a part of the outside of the side plate part is covered with an outside part of the side wall part, and the side wall upper cover part is curved such that a tip faces the mating recess and covers at least a part of the upper surface of the inside part of the side wall part.

20 Claims, 10 Drawing Sheets

(58) Field of Classification Search
CPC .. H01R 12/771; H01R 13/62; H01R 12/7005; H01R 24/00; H01R 12/71; H01R 12/58; H01R 13/2407
See application file for complete search history.

(56) References Cited

U.S. PATENT DOCUMENTS

| | | | | |
|---|---|---|---|---|
| 9,356,371 | B2 * | 5/2016 | Goto | H01R 12/73 |
| 9,362,637 | B2 * | 6/2016 | Hasegawa | H01R 12/716 |
| 9,666,963 | B2 | 5/2017 | He et al. | |
| 9,899,771 | B2 * | 2/2018 | Ashibu | H01R 24/60 |
| 10,249,969 | B2 | 4/2019 | Ono | |
| 10,651,581 | B1 * | 5/2020 | Sasayama | H01R 13/631 |
| 10,923,854 | B2 * | 2/2021 | Tanaka | H01R 13/6275 |
| 2012/0231637 | A1 * | 9/2012 | Takeuchi | H01R 12/716 439/65 |
| 2013/0280926 | A1 * | 10/2013 | Ono | H01R 12/7052 439/65 |
| 2014/0227910 | A1 * | 8/2014 | Tanaka | H01R 13/04 439/626 |
| 2015/0303597 | A1 * | 10/2015 | He | H01R 12/7088 439/345 |
| 2018/0331444 | A1 * | 11/2018 | Ono | H01R 13/504 |
| 2020/0358213 | A1 * | 11/2020 | Tanaka | H01R 12/716 |

FOREIGN PATENT DOCUMENTS

| | | | |
|---|---|---|---|
| CN | 104733897 | A | 6/2015 |
| CN | 106025710 | A | 10/2016 |
| CN | 206893852 | U | 1/2018 |
| CN | 207459247 | U | 6/2018 |
| CN | 109103697 | A | 12/2018 |
| CN | 208423285 | U | 1/2019 |
| JP | 2015207557 | A | 11/2015 |
| JP | 2017168210 | A | 9/2017 |
| JP | 6385875 | B2 | 9/2018 |
| JP | 2018142456 | A | 9/2018 |
| JP | 2018147820 | A | 9/2018 |
| KR | 20150068919 | A | 6/2015 |
| KR | 20180112359 | A | 10/2018 |
| KR | 20190044922 | A | 5/2019 |
| TW | M537322 | U | 2/2017 |
| WO | 2014132284 | A1 | 9/2014 |

OTHER PUBLICATIONS

Office action received for Korean patent application No. 10-2020-0053147, dated Sep. 14, 2021, 11 pages (6 pages of English translation and 5 pages of Official copy).

* cited by examiner

Prior art

CONNECTOR AND CONNECTOR ASSEMBLY

RELATED APPLICATIONS

This application is a continuation of U.S. application Ser. No. 16/857,185, filed on Apr. 24, 2020, which claims priority to Japanese Application Serial No. 2019-088277, filed on May 8, 2019, each of which are incorporated by reference in their entireties.

TECHNICAL FIELD

The present disclosure relates to a connector and a connector assembly.

BACKGROUND ART

Conventionally, connectors such as board to board connectors, etc., have been used to electrically connect pairs of parallel circuit boards together. Such connectors are attached to each mutually facing surface on pairs of circuit boards and mated together so as to be connected. In addition, technology has been proposed in which reinforcing brackets attached to both ends function as locking members to maintain a mated state with the counterpart connector (for example, see Patent Document 1).

FIG. 10 is a perspective view illustrating a known connector.

In the figure, reference numeral 811 denotes a housing of a connector mounted to a circuit board not illustrated, and the connector is mated with a counterpart connector not illustrated and electrically connected thereto. The housing 811 includes a pair of longitudinally extending side wall parts and a pair of mating guide parts connected to both longitudinal ends of the side wall, and each mating guide part includes a mating recess. A plurality of terminals 861 is attached to the side wall part, and a reinforcing bracket 851 is attached to the mating guide part. The reinforcing bracket 851 has a side arm 853 extending along a side wall part of the housing 811 and a U-shaped arm 858 extending along the mating recess, and the tip of the U-shaped arm 858 is engageable with a recess 817 formed at both ends of an intermediate island 813 of the housing 811.

Then, when the connector mates with the counterpart connector, the terminals 861 and mating terminals of the counterpart connector come into contact with each other. As a result, the circuit board on which the connector is mounted is electrically connected to a counterpart circuit board on which the counterpart connector is mounted. Further, the mating projections of the counterpart housing enter into the mating recesses of the mating guide parts of the housing. The reinforcing brackets 851 attached to the mating guide parts engage with respective counterpart reinforcing brackets attached to the mating projections of the counterpart housing.

Patent Document 1: Japanese Unexamined Patent Application Publication No. 2015-207557

SUMMARY

However, in the known connector, during the mating operation, the housing 811 may be damaged or broken. When the connector attached to the circuit board is mated with the counterpart connector attached to the counterpart circuit board, depending on the operating conditions, the operator cannot visually recognize the mating surface of the housing 811 and the mating surface of the counterpart housing, and thus has to feel about with his/her hands to perform the mating operation. Especially, miniaturization and reduction in the size of the board to board connector has recently advanced, making it difficult for the operator to view the mating surface of the housing 811 and the mating surface of the counterpart housing.

In this case, the operator feels about with his/her hands to adjust the position of the counterpart housing with respect to the housing 811 while sliding the mating surface of the housing 811 and the mating surface of the counterpart housing, and inserts the mating projections of the counterpart housing into the mating recesses of the housing 811.

For this reason, when a force is applied from the counterpart housing to the housing 811 in the mating direction, or the counterpart housing is rotated with respect to the housing 811 in the state where the alignment of the housing 811 with the counterpart housing has not been completed, the mating surface of the counterpart housing may be rubbed against the mating surface of the housing 811. In such cases, a part of the mating surface of the housing 811 may receive a large pressing force and become damaged or broken. Especially, since miniaturization and reduction in the size of the board to board connector has recently advanced, when the thickness of each part of the housing 811 is thin and subjected to a strong force, the part is easily damaged. Furthermore, the terminals 861 may come into contact with a member of the counterpart connector such as the counterpart housing, and become damaged or broken.

Also, the reinforcing brackets 851 and the mating reinforcing brackets may be used as electrical circuit connecting members by connecting the reinforcing brackets 851 and the counterpart reinforcing brackets to power lines of the circuit board and the counterpart circuit board. However, for the reinforcing brackets 851 not having sufficient flexibility, when vibrations and shocks generated when electronic equipment or the like on which the circuit board is mounted is dropped or is subjected to an external force are transmitted the reinforcing brackets, contact between the reinforcing bracket 851 and the mating reinforcing bracket is not maintained, failing to ensure sufficient electrical communication for the power line.

Here, an object of the present disclosure is to solve the problems of the known connector, and to provide a connector and a connector assembly with high reliability without damaging or breaking the mating guide part or the like of the connector body during the mating operation.

A connector includes: a connector body, a terminal attached to the connector body, and a reinforcing bracket attached to the connector body, the connector body includes mating guide parts formed on both longitudinal ends, the mating guide parts having mating recesses into which counterpart mating guide parts formed at both longitudinal ends of a counterpart connector body of a counterpart connector are inserted, the reinforcing bracket includes a body part extending in a width direction of the connector body, the body part being attached to end wall parts of the mating guide parts, and a pair of left and right connection arms extending from both ends of the body part, the connection arms being attached to side wall parts of the mating guide parts, and the connection arm includes a side plate part and a side wall upper cover part connected to an upper end of the side plate part, and at least a part of the outside of the side plate part is covered with an outside part of the side wall part.

In another connector, the side plate part includes a through-hole through which the outside part and an inside part of the side wall part are connected.

In yet another connector, an upper surface of the outside part of the side wall part is located lower than an upper end of the side wall upper cover part.

Further, in yet another connector, a lower end surface of the side plate part is exposed below the side wall part, and is capable of coming into contact with a surface of a circuit board on which the connector is mounted.

In yet another connector, the reinforcing bracket includes a bottom surface cover part covering a bottom surface of the mating recess, and a pair of left and right contact arm parts connected to both left and right sides of the bottom surface cover part, the contact arm parts being capable of coming into contact with the counterpart reinforcing bracket attached to the counterpart mating guide parts inserted into the mating recesses, and the contact arm parts each include a spring part that is elastically displaceable in a width direction of the connector body, and a contact projection connected to a free end of the spring part, the contact projection protruding in the width direction of the connector body.

In yet another connector, an upper half of the contact projection extends such that a tip faces diagonally upward toward the outside in the width direction of the connector body, and the tip is opposed proximate to a tip of the side wall upper cover part and located below the tip of the side wall upper cover part.

A connector assembly includes the connector of the present disclosure and the counterpart connector mating with the connector.

According to the present disclosure, the mating guide part or the like of the connector body is not damaged or broken during the mating operation, improving the reliability of the connector.

BRIEF DESCRIPTION OF DRAWINGS

FIG. 3A is a plan view, and FIG. 3B is a cross-sectional view taken along a line A-A in FIG. 3A.

FIG. 4A is a cross-sectional view taken along a line B-B in FIG. 3A, and FIG. 4B is a cross-sectional view taken along a line C-C in FIG. 3A.

DETAILED DESCRIPTION OF PREFERRED EMBODIMENTS

An embodiment will be described in detail below with reference to the drawings.

Figure 1:
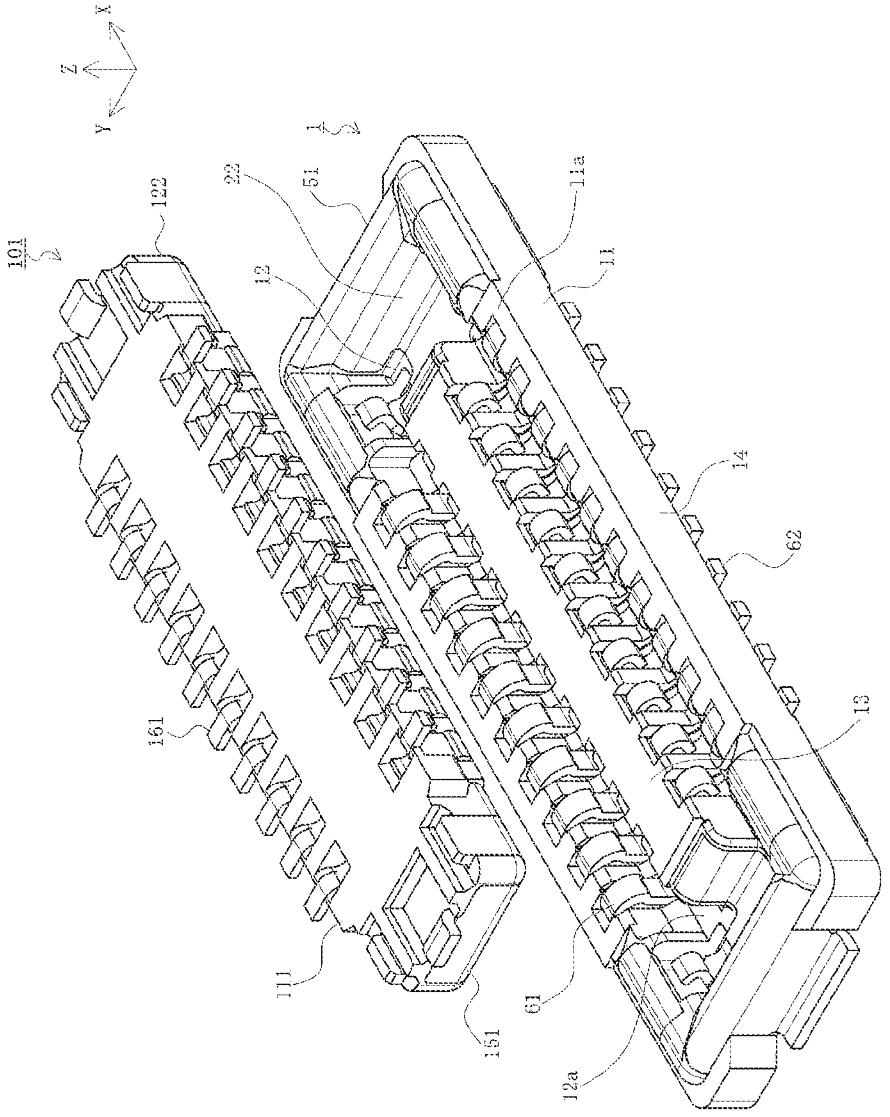
FIG. 1 is a perspective view illustrating the positional relationship between a first connector and a second connector prior to mating according to the present embodiment when viewed from the second connector side.
Figure 2:
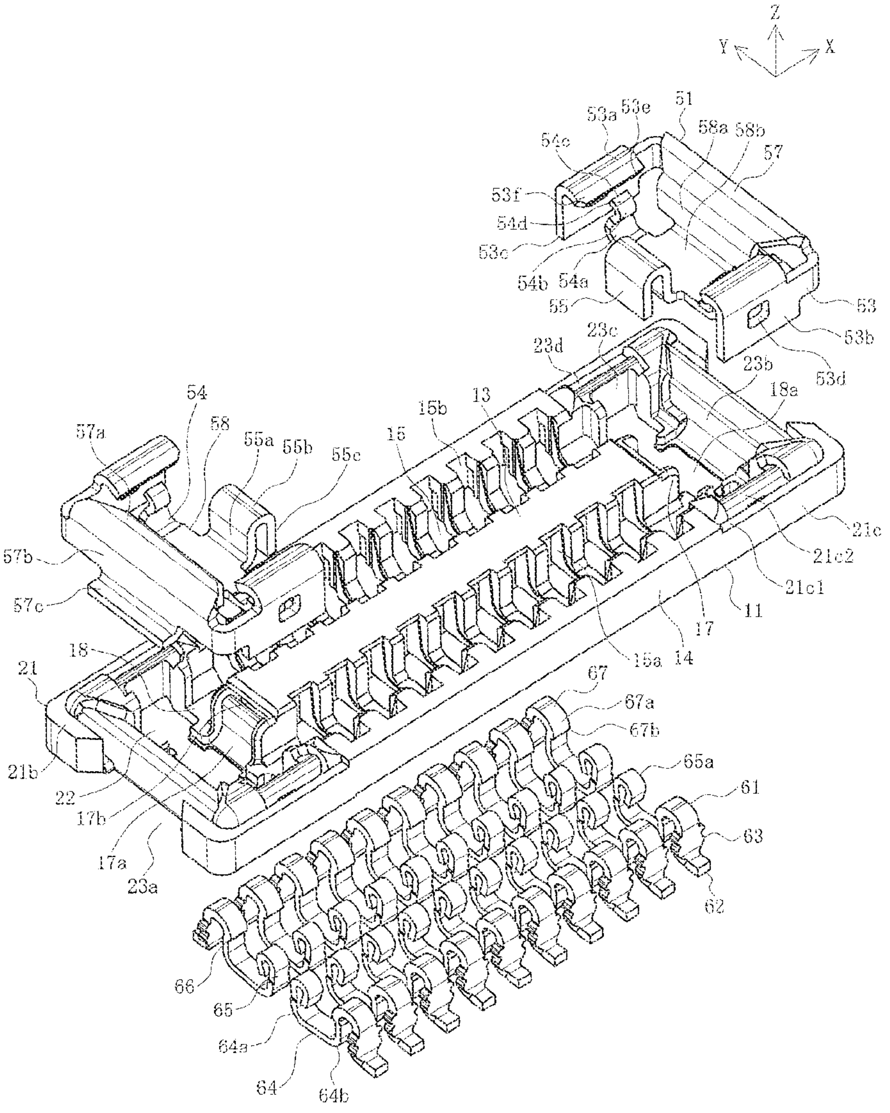
FIG. 2 is an exploded view illustrating the first connector according to the present embodiment.
Figure 3A:
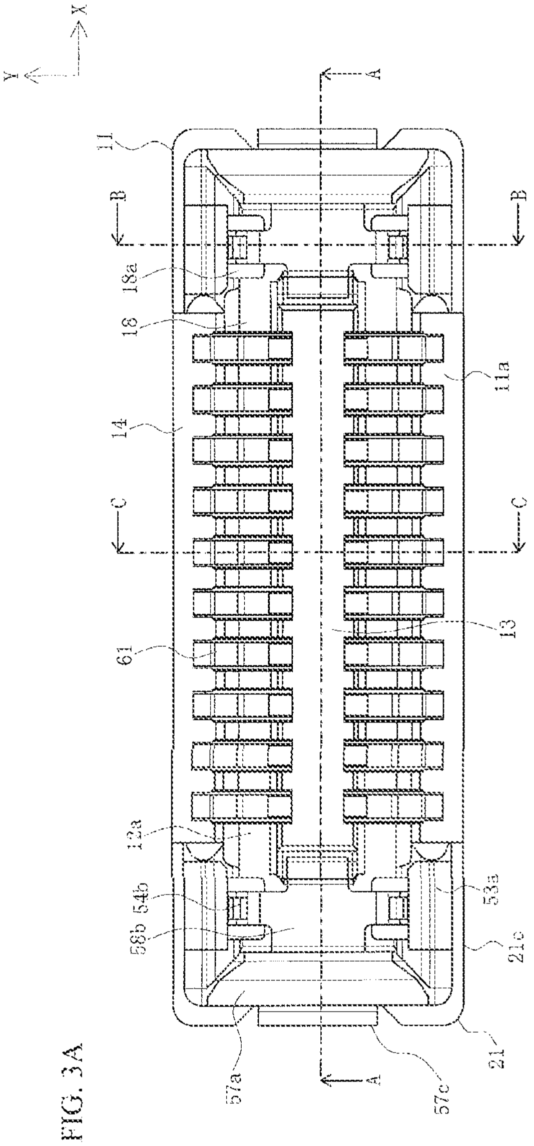
FIGS. 3A and 3B show two views illustrating the first connector according to the present embodiment.
Figure 3B:
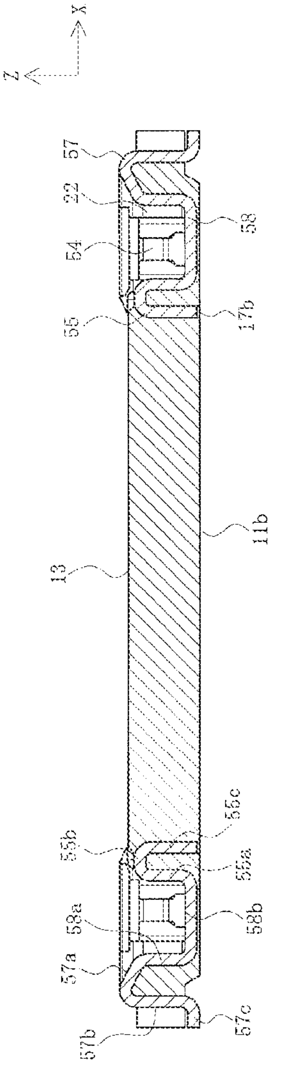
Figure 4A:
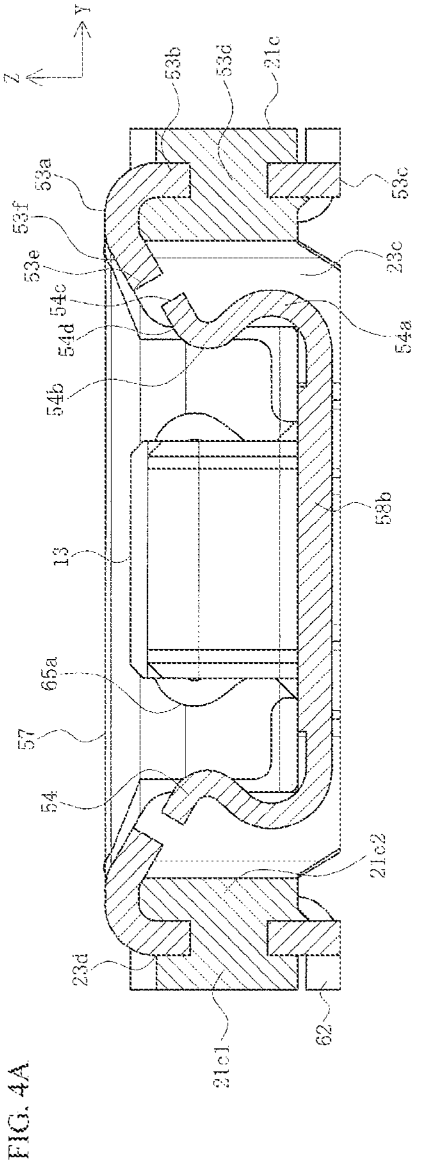
FIGS. 4A and 4B show cross-sectional views illustrating the first connector according to the present embodiment.
Figure 4B:
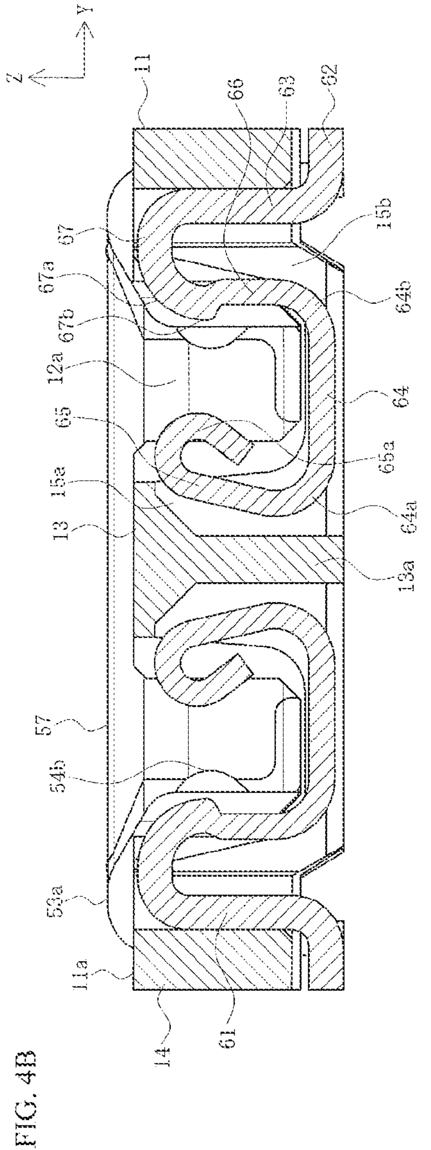

FIG. 1 is a perspective view illustrating the positional relationship between a first connector and a second connector prior to mating according to the present embodiment when viewed from the second connector side. FIG. 2 is an exploded view illustrating the first connector according to the present embodiment, FIGS. 3A and 3B show views illustrating the first connector according to the present embodiment, and FIGS. 4A and 4B show cross-sectional views illustrating the first connector according to the present embodiment. In FIGS. 3A and 3B, FIG. 3A is a plan view, FIG. 3B is a rear view taken along a line A-A in FIG. 3A. In FIGS. 4A and 4B, FIG. 4A is a cross-sectional view taken along a line B-B in FIG. 3A, and FIG. 4B is a cross-sectional view taken along a line C-C in FIG. 3A.

In the figures, 1 is a connector of the present embodiment and is the first connector serving as one of a pair of board to board connectors serving as a connector assembly. The first connector 1 is a surface mount type connector mounted on the surface of a first substrate (not illustrated) serving as a mounting member and is mated to a second connector 101 serving as a counterpart connector. Furthermore, the second connector 101 is the other of the pair of board to board connectors and is a surface mount type connector mounted on the surface of a second substrate (not illustrated) serving as a mounting member.

Note that while the first connector 1 and the second connector 101 are ideally used for electrically connecting the first substrate and the second substrate serving as substrates, the connectors can also be used to electrically connect other members. Examples of the first substrate and the second substrate include printed circuit boards, flexible flat cables (FFC), flexible printed circuit boards (FPC), etc. used in electronic equipment, etc., but may be any type of substrate.

Furthermore, expressions indicating directions such as up, down, left, right, front, and back used to describe the operations and configurations of the parts of the first connector 1 and the second connector 101 in the present embodiment are not absolute but rather are relative directions, and though appropriate when the parts of the first connector 1 and the second connector 101 are in the positions illustrated in the figures, these directions should be interpreted differently when these positions change in order to correspond to that change.

Furthermore, the first connector 1 has a first housing 11 as a connector body integrally formed of an insulating material such as synthetic resin. As illustrated in the drawing, the first housing 11 is a substantially rectangular body having a substantially rectangular thick plate shape, wherein a recess 12 serving as a substantially rectangular recess surrounded by a periphery and mating with a second housing 111 of the second connector 101 is formed on the side in which the second connector 101 fits—that is, on the mating surface 11*a* side (Z-axis positive direction side). The first connector 1 has, for example, dimensions of a vertical length (in the X-axis direction) of approximately 6.0 [mm], a horizontal width (in the Y-axis direction) of approximately 2.0 [mm], and a thickness (in the Z-axis direction) of approximately 0.6 [mm] and however, the dimensions may be changed appropriately. In addition, in the first recess 12, a first projection 13 which serves as an intermediate island mating with a recessed groove 113 described below is formed integrally with the first housing 11, and on both sides (Y-axis positive direction side and negative direction side) of the first projection 13, side wall parts 14 which extend parallel to the first projection 13 are formed integrally with the first housing 11.

In this case, the first projection 13 and the first side wall part 14 protrude upward from a bottom plate 18 which defines the bottom surface of the recess 12 (Z-axis positive direction) and extends in the longitudinal direction (X-axis direction) of the first housing 11. Consequently, a recessed groove 12*a* serving as an elongated recess which extends in the longitudinal direction of the first housing 11 is formed as a portion of the first recess 12 on both sides of the first projection 13.

Here, first terminal housing inner cavities 15*a* with a recessed groove shape are formed in the side surfaces on both sides of the first projection 13. In addition, first terminal housing outer cavities 15*b* with a recessed groove shape are formed in the side surface inside the side wall part 14. Further, the first terminal housing inner cavities 15*a* and the first terminal housing outer cavities 15*b* are linked and formed integrally with one another on the bottom surface of the recessed groove 12*a*, so as to be described as first terminal housing cavities 15, when the first terminal housing inner cavities 15*a* and the first terminal housing outer cavities 15*b* are described in an integrated manner. Note that the first terminal housing cavities 15 are formed so as to penetrate through the bottom plate 18 in the plate thickness direction (Z-axis direction).

In the present embodiment, the first terminal housing cavities 15 are formed in rows in the longitudinal direction of the first housing 11 on both sides in the width direction (Y-axis direction) of the first housing 11. Specifically, a plurality of (for example, 10) cavities are formed on each side of the first projection 13 at a prescribed pitch (for example, approximately 0.35 [mm]). Note that the pitch and number of the first terminal housing cavities 15 can be appropriately changed. In addition, a plurality of first terminals 61 as terminals which are housed in each of the first terminal housing cavities 15 and installed on the first housing 11 are disposed on both sides of the first projection 13 at the same pitch.

The first terminal 61 is member which is formed integrally by performing machining such as punching and bending on a conductive metal plate, and includes: a held part 63, a tail part 62 connected to the lower end of the held part 63, an upper connection part 67 connected to the upper end of the held part 63, a second contact part 66 which is connected to the lower end of the upper connection part 67 and faces the held part 63, a lower connection part 64 connected to the lower end of the second contact part 66, and an inner connection part 65 connected to the end of the lower connection part 64 on the opposite side as the second contact part 66.

Further, the held part 63 is a part which extends in the mating direction (Z-axis direction), that is, the thickness direction of the first housing 11, and is fitted and held in the first terminal housing outer cavity 15*b*. In addition, the tail part 62 is bent and connected to the held part 63 so as to extend outward in the left-right direction (Y-axis direction)—that is, the width direction of the first housing 11—and is connected to a connection pad coupled to a conductive trace of the first substrate by soldering or the like. Note that the conductive trace is typically a signal line. Further, the upper connection part 67 is a part which is curved so as to project upward (Z-axis positive direction).

A second contact part 66 which extends downward (Z-axis negative direction) is connected to the lower end of the upper connection part 67 on the opposite side as the held part 63. Furthermore, the upper connection part 67 includes an inclined part 67*a* which descends in a linear or loosely curved manner diagonally downward from the upper end, and a protruding part 67*b* which protrudes inward in the width direction of the first housing 11 at the lower end of the inclined part 67*a*.

In addition, the lower connection part 64 is a portion having a substantially U-shaped side surface shape connected to the lower end of the second contact part 66. In the lower connection part 64, the portion connected to the lower end of the second contact part 66 is a lower outer curved part 64*b*, and the portion connected to the lower end of the inner connection part 65 is a lower inner curved part 64*a*. Further, a first contact part 65*a* which is curved approximately 180 degrees so as to project upward and toward the second contact part 66 is connected to the upper end of the inner connection part 65.

The first terminals 61 are fitted into the first terminal housing cavities 15 from the mounting surface 11*b*, which is the lower surface (Z-axis negative direction surface) of the first housing 11, and the held parts 63 are sandwiched from both sides by the side walls of the first terminal housing outer cavities 15*b* formed on the side surface inside the side wall part 14 so as to be fixed to the first housing 11. In this state—that is, in a state in which the first terminals 61 are mounted on the first housing 11—the first contact parts 65*a* and second contact parts 66 are positioned on both the left and right sides of the recessed groove 12*a* so as to face one another.

In addition, as illustrated in FIG. 4B, when viewed from the longitudinal direction (X-axis direction) of the first housing 11, most of the held part 63 is housed inside the first terminal housing outer cavity 15*b*, and most of the first contact part 65*a* is housed in the first terminal housing inner cavity 15*a*. Furthermore, the upper surface of the upper connection part 67 is located lower than the upper surface of the side wall part 14, that is, the mating surface 11*a* of the first housing 11, and the upper surface of the first contact part 65*a* is also located lower than the upper surface of the first projection 13. In other words, the first terminal 61 does not protrude from the mating surface 11*a*.

Note that the first terminal 61 is a member which is integrally formed by processing a metal plate and therefore has a certain degree of elasticity. As is clear from this shape, the spacing between the first contact part 65*a* and the second contact part 66 may vary elastically. That is, when the second terminal 161 of the second connector 101 is inserted between the first contact part 65*a* and the second contact part 66, this causes the spacing between the first contact part 65*a* and the second contact part 66 to be elongated elastically.

The portion of the first projection 13 corresponding to the first terminal housing inner cavity 15*a* is a thin wall part 13*a* having a small dimension in the width direction. Accordingly, even when the second terminal 161 is inserted between the first contact part 65*a* and the second contact part 66 and the spacing between the first contact part 65*a* and the second contact part 66 is elongated elastically, the first terminal 61—more specifically, the inner connection part 65 or the lower inner curved part 64*a*-does not touch the thin wall part 13*a* of the first projection 13. Note that, the dimension in the width direction of the part of the first projection 13, which does not corresponds to the first terminal housing inner cavity 15*a*, is not reduced, and the lower end thereof is connected to a bottom plate 18 which defines the bottom surface of the recessed grooves 12*a*.

Moreover, each first protruding end part 21 as a mating guide part is disposed on both ends in the longitudinal direction of first housing 11. Mating recess 22 as a portion of recess 12 is formed on each first protruding end part 21. The mating recess 22 is a substantially rectangular recess connected to both ends in the longitudinal direction of each recessed groove 12*a*. Additionally, in the state in which the first connector 1 and the second connector 101 are mated, a second protruding end part 122 contained in second connector 101 is inserted into the mating recess 22.

Further, the first protruding end part 21 includes: a side wall extension 21*c* serving as a side wall part of the first protruding end part 21 extending in the longitudinal direction of the first housing 11 from both sides in the longitudinal direction of the side wall part 14, and an end wall part 21*b* which extends in the width direction of the first housing 11 and is connected at both ends to the side wall extension 21*c*. In each first protruding end part 21, the first end wall part 21*b* and the side wall extension 21*c* connected to both ends thereof form a continuous substantially U-shaped side wall and define three sides of a substantially rectangular mating recess 22. Further, in the first end wall part 21*b*, a concave outer end recess 23*a* is formed in the outer surface, and a concave inner end recess 23*b* is formed in the inner surface. Moreover, a concave inner recess 23*c* is formed on the inner side surface of the first side wall extension 21*c*. Furthermore, a slit-shaped intermediate recess 23*d* penetrating in the vertical direction is formed between the inner surface and the outer surface.

Further, a concave island end recess 17*a* is formed in the longitudinal end surface (surface opposed to the end wall part 21*b*) of the island end part 17, which is the end part of the first projection 13 in the longitudinal direction of the first housing 11. Further, a slit-shaped island recess 17*b* which penetrates in the vertical direction is formed in a boundary part of the island end part 17 with the island end recess 17*a*. In addition, a bottom plate 18 which defines the bottom surface of the mating recess 22 has a bottom opening 18*a* formed so as to penetrate the bottom plate 18 in the plate thickness direction.

A first reinforcing bracket 51 serving as a reinforcing bracket mounted on the first housing 11 is attached to the first protruding end part 21. In the present embodiment, the first reinforcing bracket 51 is a member which is formed integrally by punching and bending a metal plate, and includes an end wall cover part 57 which serves as a body part covering the outside of the end wall part 21*b* of the first protruding end part 21, connection arms 53 connected to both the left and right ends of the end wall cover part 57, a bottom surface cover parts 58 which is connected to the end wall cover part 57 and covers the bottom surface of the mating recess 22, an island end cover part 55 connected to the bottom surface cover parts 58, and a pair of left and right contact arm parts 54.

The first reinforcing bracket 51 and the first housing 11 are integrated with each other by overmolding (insert molding). Thus, parts of the first housing 11 where the first reinforcing bracket 51 is attached, for example, the outer end recess 23*a*, the inner end recess 23*b*, the intermediate recess 23*d*, the island end recess 17*a*, and the slit-shaped island recess 17*b* are not necessarily present in the shape as illustrated in FIG. 2 and in the state away from the first reinforcing bracket 51, and FIG. 2 is merely drawn for convenience of explanation.

The end wall cover part 57 includes an end wall upper cover part 57*a* which extends in the width direction of the first housing 11 and covers most of the upper surface of the end wall part 21*b*, an end wall outer cover part 57*b* which extends downward from the outer edge of the end wall part 21*b* in the end wall upper cover part 57*a*, and a tail part 57*c* which is bent and connected to the lower end of the end wall outer cover part 57*b*, that is, extends outward in the longitudinal direction (X-axis direction) of the first housing 11.

The end wall upper cover part 57*a* is an inclined part extending diagonally downward from the upper end of the end wall part 21*b* toward the mating recess 22, and is housed in an upper end-adjoining part of the inner end recess 23*b*, with the outer surface of the inclined part exposed. Therefore, as illustrated in FIG. 3B, the vicinity of the upper end of the inner surface of the mating recess 22 on the side of the end in the longitudinal direction of the first housing 11 is an inclined surface covered with the end wall upper cover part 57 *a*. The outer end recess 23*a* of the end wall part 21*b* is substantially entirely covered with the end wall outer cover part 57*b*. Moreover, the tail part 57*c* is connected to the connection pad connected to the conductive trace of the first substrate by soldering or the like. Note that the conductive trace is typically a power line or a ground line.

Further, the connection arms 53 are members bent and connected to both ends of the end wall cover part 57 in the width direction (Y-axis direction) and extend toward the longitudinal center of the first housing 11. Moreover, a substantially rectangular flat plate-like side plate part 53*b* is formed on the tip of each connection arm 53, and a side wall upper cover part 53*a* is connected to an upper end of the side plate part 53*b*.

When the first reinforcing bracket 51 and the first housing 11 are integrated, most of the connection arm 53 is embedded in the first protruding end part 21, and most of the side plate part 53*b* is embedded in the side wall extension 21*c* so as to be housed in the intermediate recess 23*d* formed in the side wall extension 21*c*, as illustrated in FIG. 4A. Accordingly, both the outside and the inside of the side plate part 53*b* are covered with an insulating material such as a synthetic resin which forms the first housing 11. That is, at least a part, desirably most of the outside of the side plate part 53*b* is covered with a side wall extension outer part 21*c*1 which defines the outside of the intermediate recess 23*d*, and at least a part, desirably, most of the inside of the side plate part 53*b* is covered with a side wall extension inner part 21*c*2 which defines the inside of the intermediate recess 23*d*. Note that a through-hole 53*d* which penetrates the side plate part 53*b* in the plate thickness direction is formed in the side plate part 53*b*, and the side wall extension outer part 21*c*1, which serves as the outside part of the side wall extension 21*c*, and the side wall extension inner part 21*c*2, which serves as the inside part of the side wall extension 21*c*, are connected to each other through the through-hole 53*d*. Thus, the side wall extension 21*c* is firmly integrated with the side plate part 53*b*, and exhibits high strength even when the width direction is small and thin.

Note that the side plate part 53*b* in the mating direction, that is, the vertical direction (Z-axis direction) is larger than the side wall extension 21*c*, and the vicinities of the upper end and the lower end of the side plate part 53*b* are exposed above and below the side wall extension 21*c*. Furthermore, a lower end surface 53*c* of the side plate part 53*b* is flush with the bottom surface of the tail part 57*c*, abuts the surface of the first substrate, and is preferably connected to the connection pad connected to a power line or ground line by soldering or the like. As a result, the strength of the integrated side wall extension 21*c* and side plate part 53*b* is further improved.

In addition, the side wall upper cover part 53*a* connected to the upper end of the side plate part 53*b* curves by 90 degrees or more, and a tip 53*e* thereof extends diagonally downward toward the mating recess 22, such that the top surface near the tip 53*e* becomes an inclined surface 53*f*. As illustrated in FIG. 4A, the side wall upper cover part 53*a* is curved so as to make the radius of curvature relatively small, and is exposed to cover at least a part, desirably most of the top surface of the side wall inner extension part 21*c*2. Note that the upper surface of the side wall extension outer part 21*c*1 is exposed without being covered with the side wall upper cover part 53*a*, but is located lower than the upper end of the side wall upper cover part 53*a*. The position of the upper end of the side wall upper cover part 53*a* is equivalent to the position of the upper end of the end wall upper cover part 57*a*.

The bottom surface cover part 58 includes a vertically extending end wall lower cover part 58*a* which is bent and connected to a tip of an end wall upper cover part 57*a* of the end wall cover part 57, and a bottom surface part 58*b* which is bent and connected to a lower end of the end wall lower cover part 58*a* by 90 degrees and extends toward the longitudinal center of the first housing 11 in substantially parallel to the X-Y plane. The end wall lower cover part 58*a* covers most of the lower half of the inner end recess 23*b* formed in the end wall part 21*b*. Further, the bottom surface part 58*b* covers most of the bottom opening 18*a* which penetrates the bottom plate 18 in the plate thickness direction, and the top surface thereof is a substantially bottom surface of the mating recess 22.

The island end cover part 55 is bent and connected to a tip of the bottom surface part 58*b* of the bottom surface cover part 58 by approximately 90 degrees, and includes an island end outer surface cover part 55*a* which extends in the vertical direction, an island end upper surface cover part 55*b* which is connected to an upper end of the island end outer surface cover part 55*a* and curves by approximately 180 degrees, and an island end sunk part 55*c* that extends downward from a tip of the island end upper surface cover part 55*b*. Note that the dimension of the width direction of the island end cover part 55 is narrower than the dimension of the width direction of the bottom surface cover part 58, and is set to be slightly narrower than the width of the first projection 13.

When the first reinforcing bracket 51 and the first housing 11 are integrated, the whole of the island end sunk part 55*c* and a part of the island end upper surface cover part 55*b* are embedded in the first projection 13 so as to be housed in the slit-shaped island recess 17*b*, as illustrated in FIG. 3B. Additionally, most of the island end outer surface cover part 55*a* and the island end upper surface cover part 55*b* cover the entire island end recess 17*a*, and are exposed at the end of the first projection 13. As a result, the end of the first projection 13 is covered with the integrated island end cover part 55, and thus is reliably protected. In addition, at both longitudinal ends of the first reinforcing bracket 51, the end wall cover part 57 is integrated with the end wall part 21*b* and the island end cover part 55 is integrated with the first projection 13, improving strength.

Each of the pair of left and right contact arm parts 54 has a spring part 54*a* connected to a side end of the bottom surface part 58*b* of the bottom surface cover part 58 at the base end thereof, and a contact projection 54*b* connected to a tip (free end) of the spring part 54*a*. As illustrated in FIG. 4A, the contact arm part 54 is a plate member curved so as to substantially have an S-shape when viewed from the front-back direction. The spring part 54*a* is a part curved so as to protrude outward in the width direction of the first housing 11, and the tip thereof functions as a spring elastically displaceable in the width direction of the first housing 11. Further, the contact projection 54*b* is a part curved so as to protrude toward the center of the first housing 11 in the width direction, and comes into contact the second reinforcing bracket 151 of the second connector 101 when the first connector 1 is mated with the second connector 101 and the second protruding end part 122 is inserted into the mating recess 22. Note that when the contact projection 54*b* comes into contact with the second reinforcing bracket 151 of the second connector 101, the spring part 54*a* elastically displaces outward in the width direction of the first housing 11, but is housed in the inner recess 23*c* formed on the inner surface of the side wall extension 21*c*, and thus does not abut the side wall extension 21*c*.

Furthermore, a tip 54*c* of the upper half of the contact projection 54*b* extends diagonally upward and outward in the width direction of the first housing 11, and the upper surface of the contact projection 54*b* near the tip 54*c* becomes an inclined surface 54*d*. As illustrated in FIG. 4A, the tip 54*c* of the contact projection 54*b* is opposed proximate to the tip 53*e* of the side wall upper cover part 53*a*, and the inclined surface 54*d* of the contact projection 54*b* is substantially parallel to the inclined surface 53*f* of the side wall upper cover part 53*a*, but is offset below the inclined plane in which the inclined surface 53*f* is present. Thus, when the second protruding end part 122 is inserted into the mating recess 22, the second reinforcing bracket 151 first abuts the inclined surface 53*f* of the side wall upper cover part 53*a* and slides along the inclined surface 53*f* and then, slides against the inclined surface 54*d* of the contact projection 54*b*, preventing a large downward force from acting on the contact arm part 54 to prevent buckling of the spring part 54*a*. In addition, since the side wall upper cover part 53*a* and the contact arm parts 54 are individually connected to the connection arm 53 and the bottom surface cover part 58, respectively even when the second reinforcing bracket 151 collides with the side wall upper cover part 53*a* to deform the connection arm 53, displacement of the contact arm part 54 is prevented.

Next, the configuration of the second connector 101 will be described.

Figure 5:
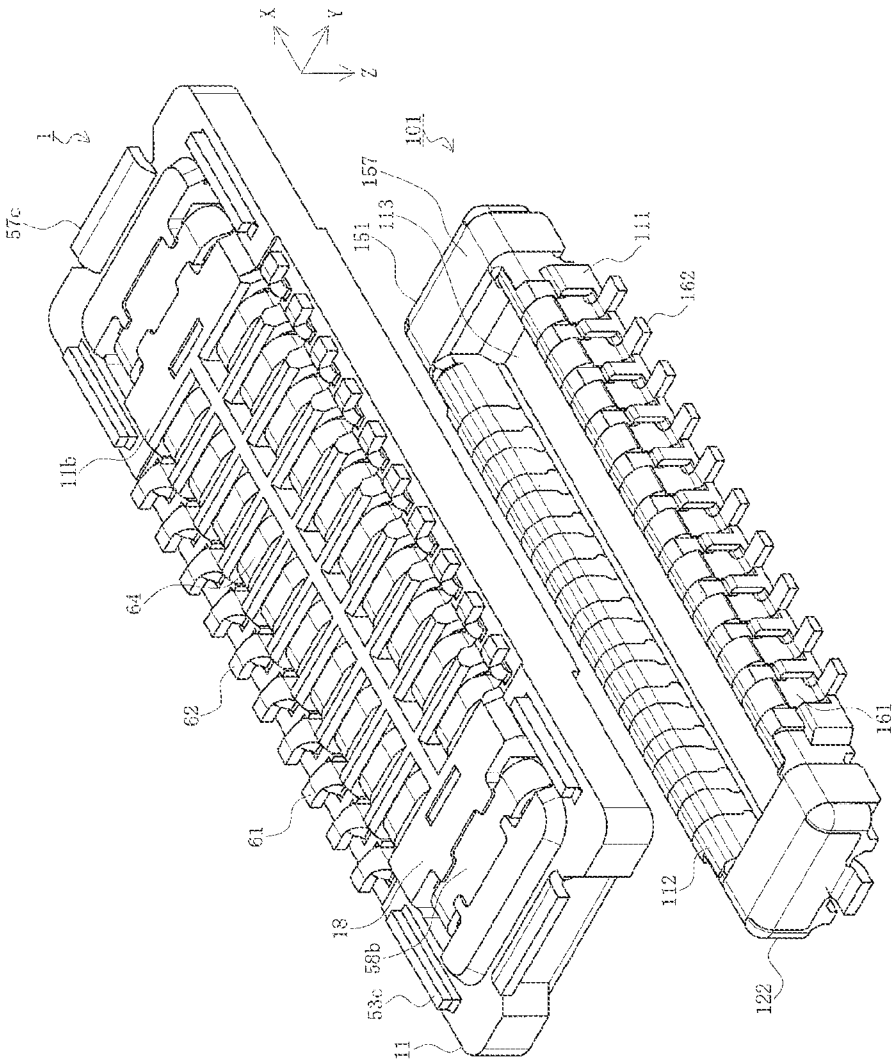
FIG. 5 is a perspective view illustrating the positional relationship between the first connector and the second connector prior to mating according to the present embodiment when viewed from the first connector side.
Figure 6:
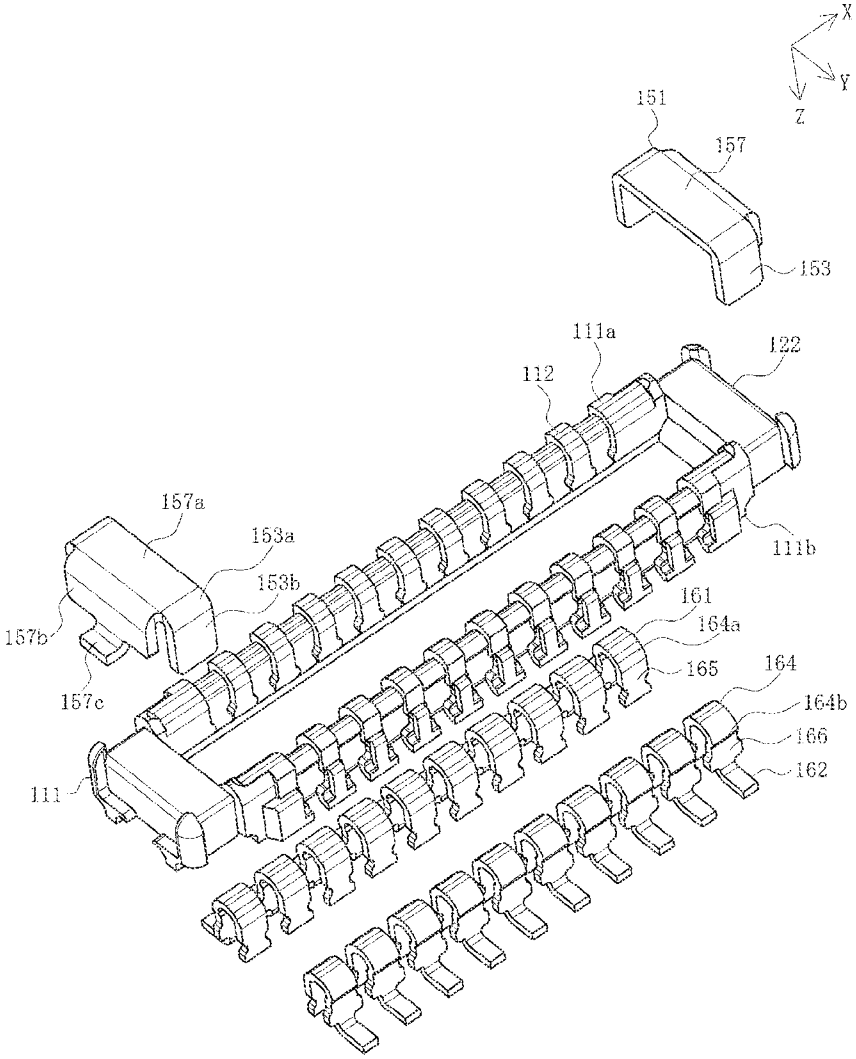
FIG. 6 is an exploded view illustrating the second connector according to the present embodiment.
Figure 7:
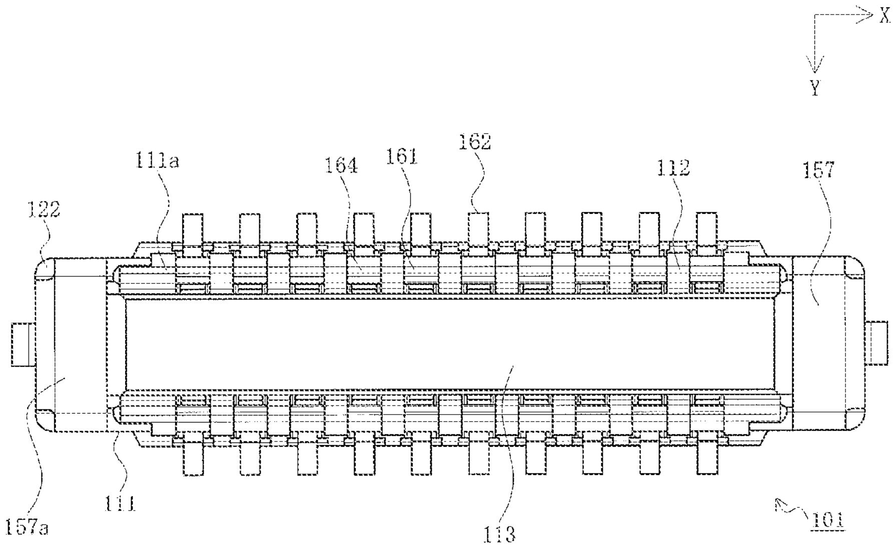
FIG. 7 is a plan view illustrating the second connector according to the present embodiment.

FIG. 5 is a perspective view illustrating the positional relationship between the first connector and the second connector prior to mating according to the present embodiment when viewed from the first connector side. FIG. 6 is an exploded view of the second connector according to the present embodiment. FIG. 7 is a plan view of the second connector according to the present embodiment.

The second connector 101 as a counterpart connector according to the present embodiment has the second housing 111 as a counterpart connector body integrally formed of an insulating material such as synthetic resin. As illustrated in the figure, this second housing 111 is a substantially rectangular body with the shape of a substantially rectangular thick plate. In addition, an elongated recessed groove 113 extending in the longitudinal direction (X-axis direction) of the second housing 111, and a second projection 112 serving as an elongated projection, which defines the outside of the recessed groove 113 and extends in the longitudinal direction of the second housing 111, are integrally formed on the side of the second housing 111 which is fitted into the first connector 1—that is, the mating surface 111*a* side (Z-axis negative direction side). The second projection 112 is formed along both sides of the recessed groove 113 and along both sides of the second housing 111. The second connector 1 has, for example, dimensions of a vertical length of approximately 5.2 [mm], a horizontal width of approximately 1.9 [mm], and a thickness of approximately 0.5 [mm], however, the dimensions may be changed appropriately.

In addition, a second terminal 161 is disposed as a counterpart terminal in each second projection 112. The second terminal 161 is disposed at a pitch corresponding to the first terminal 61 and in a number corresponding thereto. The recessed groove 113 is closed by a bottom plate 111*b* on the side mounted to a second substrate—that is, the mounting surface 111*b* side (Z-axis positive direction side).

Moreover, each second protruding end part 122 as a counterpart mating guide part is disposed on both ends in the longitudinal direction of the second housing 111. The second protruding end part 122 is a thick member which extends in the width direction (Y-axis direction) of the second housing 111 and is connected to both ends in the longitudinal direction of each second projection 112, and the upper surface thereof has a substantially rectangular shape. Additionally, in the state in which the first connector 1 and the second connector 101 are mated, the second protruding end part 122 functions as an insertion protrusion inserted into the mating recess 22 of the first protruding end part 21 contained in the first connector 1. In addition, a second reinforcing bracket 151 is attached as a counterpart reinforcing bracket to the second protruding end part 122.

Note that the second terminals 161 and the second reinforcing brackets 151 are formed integrally with the second housing 111 by overmolding (insert molding), and are not present away from the second housing 111, however, for the sake of explanatory convenience, these portions are depicted separately from the second housing 111 in FIG. 6.

The second terminal 161 is a member which is formed integrally by performing machining such as punching and bending on a conductive metal plate, and includes: a first contact part 165, a connection part connected to the upper end of the first contact part 165, a second contact part 166 connected to the outer end of the connection part 164, and a tail part 162 connected to the lower end of the second contact part 166. The tail part 162 extends toward the outside of the second housing 111 and is connected to a connection pad coupled with a conductive trace of the second substrate by soldering or the like. Note that the conductive trace is typically a signal line. In addition, the surfaces of the first contact part 165, the connection part 164, and the second contact part 166 are exposed to each side surface of the second projection 112 and the mating surface 111*a*.

An inclined part 164*a* is formed on the side of the first contact part 165 in the connection part 164 so as to diagonally lower from the end of the mating surface 111*a* side to the mounting surface 111*b* side into the shape of a relatively long straight or loose curved surface. Further, a protruding part 164*b* is formed on the side of the second contact part 166 in the connection part 164 at the boundary with the second contact part 166 so as to protrude outward in the width direction of the second housing 111.

The second reinforcing bracket 151 is a member which is formed integrally by performing machining such as punching and bending on a metal plate, and includes: a central covering part 157 serving as a body part which covers the outside of the second protruding end part 122, and side cover parts 153 connected to both the left and right ends of the central covering part 157.

The central covering part 157 includes a protruding end upper cover part 157*a* which extends in the width direction of the second housing 111 and covers most of the upper surface of the second protruding end part 122, a connection cover part 157*b* which is curved by approximately 90 degrees and is connected to the outer edge of the second protruding end part 122 of the protruding end upper cover part 157*a*, and a tail part 157*c* which is bent and connected to the lower end of the connection cover part 157*b* and extends outward in the front-back direction (X-axis direction), that is, the longitudinal direction of the second housing 111. The tail part 157*c* is connected to the connection pad connected to the conductive trace of the second substrate by soldering or the like. Note that the conductive trace is typically a power line or a ground line.

In addition, the side cover part 153 includes connection cover parts 153*a* which are curved approximately 90 degrees and are connected to both the left and right ends of the protruding end upper cover part 157*a*, and side covering parts 153*b* which extend downward from the lower ends of the connection cover parts 153*a*. The lower end of the side covering part 153*b* is connected to the connection pad of the second substrate by soldering or the like. The connection pad is preferably coupled to the conductive trace of the second substrate, which functions as a power line or ground line.

Operations of mating the first connector 1 with the second connector 101 having the above-mentioned configuration and operations of releasing the mating will be described below.

Figure 8:
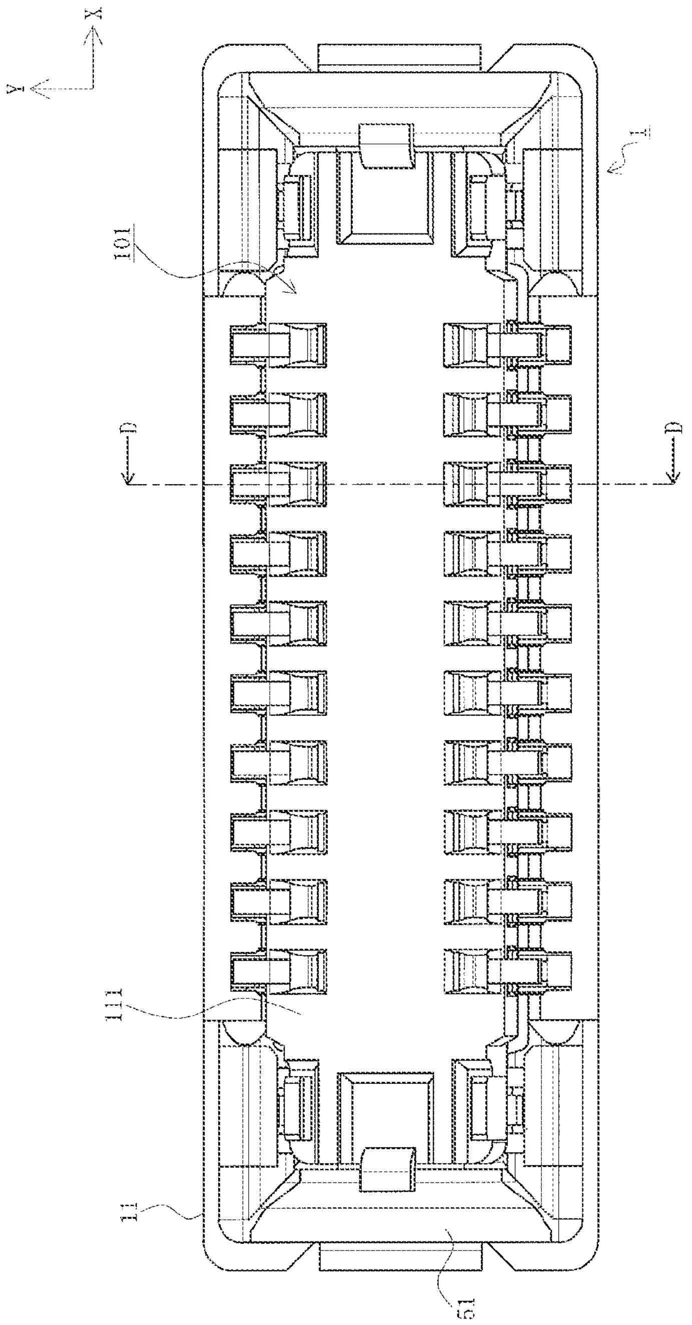
FIG. 8 is a plan view illustrating release of mating between the first connector and the second connector according to the present embodiment when viewed from the second connector side.
Figure 9:
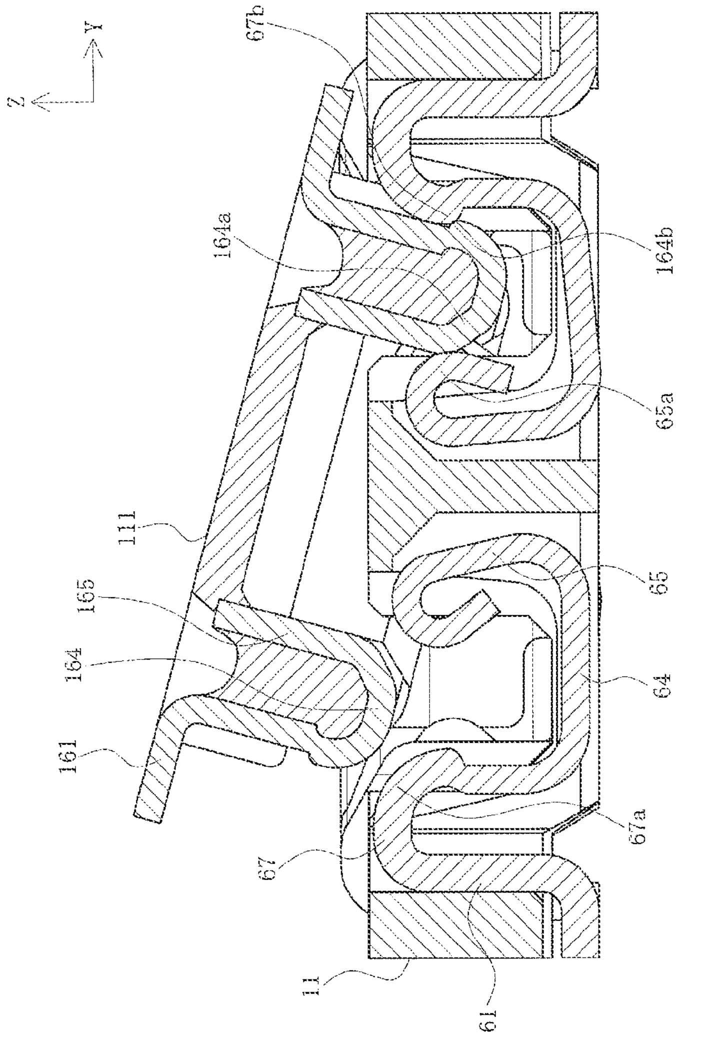
FIG. 9 is a cross-sectional view illustrating release of mating between the first connector and the second connector according to the present embodiment, taken along a line D-D in FIG. 8.
Figure 10:
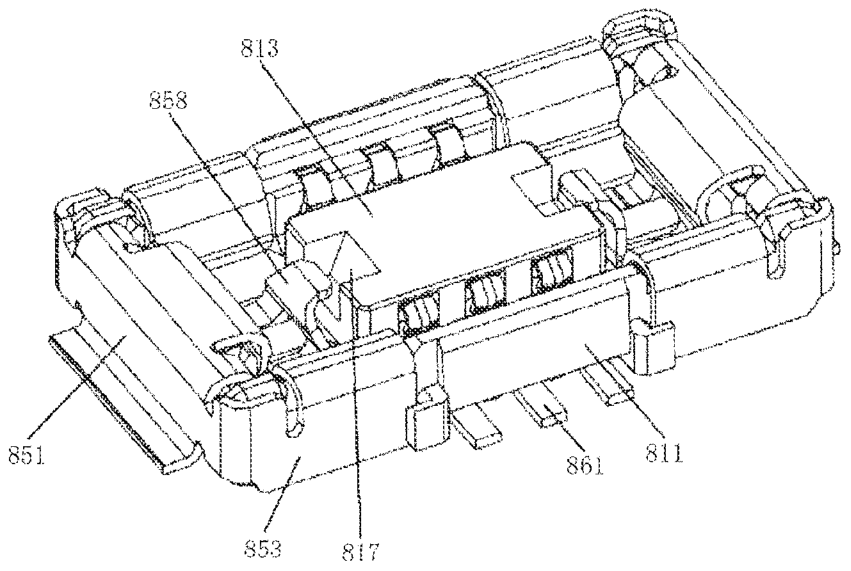
FIG. 10 is a perspective view illustrating a known connector.

FIG. 8 is a top view illustrating release of mating of the first connector with the second connector according to the present embodiment when viewed from the second connector side, and FIG. 9 is a cross-sectional view illustrating release of mating of the first connector with the second connector according to the present embodiment, taken along a line D-D in FIG. 8.

Here, the first connector 1 is mounted to the surface of the first substrate by connecting the tail parts 62 of the first terminals 61 to the connection pad coupled to the conductive trace of the first substrate (not illustrated) by soldering or the like, connecting the lower end surface 53*c* of the side plate part 53*b* of the first reinforcing bracket 51 to the connection pad coupled to the conductive trace of the first substrate by soldering or the like, and connecting the tail part 57*c* of the end wall cover part 57 of the first reinforcing bracket 51 to the connection pad of the first substrate by soldering or the like. It is assumed that the conductive trace coupled to the connection pad to which the tail parts 62 of the first terminals 61 are connected is a signal line, while the conductive trace coupled to the connection pad to which the lower end surface 53*c* of the side plate part 53*b* of the first reinforcing bracket 51 and the tail part 57*c* of the end wall cover part 57 are connected is a power line.

Similarly, the second connector 101 is mounted to the surface of the second substrate by connecting the tail parts 162 of the second terminals 161 to the connection pad coupled to the conductive trace of the second substrate not illustrated by soldering or the like, connecting the lower end of the side covering part 153*b* of the second reinforcing bracket 151 to the connection pad coupled to the conductive trace of the second substrate by soldering or the like, and connecting the tail part 157*c* of the central covering part 157 of the second reinforcing bracket 151 to the connection pad of the second substrate by soldering or the like. Note that the conductive trace coupled to the connection pad to which the tail parts 162 of the second terminals 161 are connected is a signal line, while the conductive trace coupled to the connection pad to which the lower end of the side covering part 153*b* of the second reinforcing bracket 151 and the tail part 157*c* of the central covering part 157 are connected is a power line.

First, as illustrated in FIG. 1 or 5, the operator places the mating surface 11*a* of the first housing 11 of the first connector 1 and the mating surface 111*a* of the second housing 111 of the second connector 101 as opposed to each other, such that the second projection 112 of the second connector 101 is aligned with the corresponding recessed groove 12*a* of the first connector and the second protruding end part 122 of the second connector 101 is aligned with the corresponding mating recess 22 of the first connector, to complete the alignment of the first connector 1 with the second connector 101.

In this state, if the first connector 1 and/or the second connector 101 moves in the direction approaching the counterpart side—that is, the mating direction (Z-axis direction)—then the second projection 112 and the second protruding end part 122 of the second connector 101 are inserted into the recessed groove 12*a* and the mating recess 22 of the first connector 1. As a result, when the first connector 1 and the second connector 101 are mated, the first terminals 61 and the second terminals 161 are in a conductive state.

Specifically, each second terminal 161 of the second connector 101 is inserted between the first contact part 65*a* and the second contact part 66 of each first terminal 61 so that the first contact part 65*a* of the first terminal 61 comes into contact with the first contact part 165 of the second terminal 161 and the second contact part 66 of the first terminal 61 comes into contact with the second contact part 166 of the second terminal 161. As a result, the conductive traces coupled to the connection pads on the first substrate to which the tail parts 62 of the first terminals 61 are connected become conductive with the conductive traces coupled to the connection pads on the second substrate to which the tail parts 162 of the second terminals 161 are connected. Since the protruding part 67*b* of the first terminal 61 engages with the protruding part 164*b* of the second terminal 161, the coupling between the first terminal 61 and the second terminal 161 is ensured, and the mating state between the first connector 1 and the second connector 101 is reliably maintained.

In addition, the second protruding end part 122 is inserted into the mating recess 22, such that the contact projection 54*b* of the contact arm part 54 of the first reinforcing bracket 51 comes into contact with the side covering part 153*b* of the second reinforcing bracket 151 attached to the second protruding end part 122. As a result, the conductive trace coupled to the connection pad on the first substrate to which the lower end surface 53*c* of the side plate part 53*b* of the first reinforcing bracket 51 and the tail part 57*c* of the end wall cover part 57 are connected becomes conductive with the conductive trace coupled to the connection pad on the second substrate to which the lower end of the side covering part 153*b* of the second reinforcing bracket 151 and the tail part 157*c* of the central covering part 157 are connected.

Incidentally, since the first connector 1 and the second connector 101 are respectively mounted on the first and second substrates, which have wide areas, an operator cannot visually observe the mating surface 11*a* of the first connector and the mating surface 111*a* of the second connector 101 and must perform the mating operation by trial and error. As a result, accurate alignment cannot be achieved due to the operation by trial and error, and the position of the first connector 1 and the position of the second connector 101 may be misaligned. For example, the second connector 101 may be misaligned in the X-axis direction or the Y-axis direction with respect to the first connector 1, resulting in the second protruding end part 122 of the second connector 101 being offset from the mating recess 22 of the first connector 1.

In such a state, when the operator moves the first connector 1 and/or the second connector 101 in the mating direction, the protruding end upper cover part 157*a* of the central covering part 157 covering the second protruding end part 122 of the second connector 101 abuts the side wall extension 21*c* that defines the side of the mating recess 22, and the side wall extension 21*c* receives a strong downward pressing force. However, as described above, the side plate part 53*b* of the first reinforcing bracket 51 is embedded in the side wall extension 21*c*, most of the outside of the side plate part 53*b* is covered with the side wall extension outer part 21*c*1, most of the inside of the side plate part 53*b* is covered with the side wall extension inner part 21*c*2, and the side wall extension outer part 21*c*1 and the side wall extension inner part 21*c*2 are connected to each other through the through-hole 53*d* formed in the side plate part 53*b*. Thus, the side wall extension 21*c* is thin, but has a high strength and is not damaged or broken. Note that the end wall part 21*b* is also covered with the end wall cover part 57 and integrated with the end wall cover part 57, and thus, the end wall part 21*b* has a high strength and is not damaged or broken. Additionally, the end part of the first projection 13 is also covered with the island end cover part 55 and integrated with the end wall cover part 57, and thus has a high strength and is not damaged or broken.

Furthermore, since the side wall upper cover part 53*a* connected to the upper end of the side plate part 53*b* is curved so as to make the radius of curvature relatively small, and is exposed to cover the upper surface of the side wall extension inner part 21*c*2, the upper surface of the side wall extension inner part 21*c*2 may be reliably protected with high strength. Note that the upper surface of the side wall extension outer part 21*c*1 is exposed without being covered with the side wall upper cover part 53*a*, but is located lower than the upper end of the side wall upper cover part 53*a*, and thus does not come into contact with the protruding end upper cover part 157*a* of the second connector 101. Furthermore, the first terminal 61 does not protrude from the mating surface 11*a*, that is, the top surface of the side wall part 14, and the upper surface of the side wall part 14 is located lower than the upper end of the side wall upper cover part 53*a*, and thus does not come into contact with the protruding end upper cover part 157*a* of the second connector 101. Accordingly, the first terminals 61 and the parts of the first housing 11 are not damaged or broken by the protruding end upper cover part 157*a* of the second connector 101.

In addition, since the end wall upper cover part 57*a* of the end wall cover part 57 is an inclined surface, and the side wall upper cover part 53*a* includes the inclined surface 53*f* and functions as an inflection surface, even when the second protruding end part 122 of the second connector 101 is displaced from the mating recess 22 of the first connector 1, the second protruding end part 122 may be aligned with the mating recess 22 of the first connector 1 by a so-called self-alignment function, and smoothly inserted into the mating recess 22. Accordingly, the first connector 1 may be easily mated with the second connector 101.

Next, in releasing the mating of the first connector 1 with the second connector 101, because the first connector 1 and the second connector 101 are securely mated by reliably connecting the first terminals 61 aligned in two rows along both sides of the first projection 13 to the second terminals 161 aligned in two rows along both sides of the recessed groove 113, as illustrated in FIGS. 8 and 9, it is desirable to incline the second connector 101 about the X axis with respect to the first connector 1 and to release the coupling between the first terminals 61 and the second terminals 161 by one row. Note that FIGS. 8 and 9 illustrate the state in which only the coupling between the first terminals 61 and the second terminals 161 in one row (the left row in FIG. 9) is released.

When the second connector 101 is further rotated about the X axis with respect to the first connector 1 after the coupling between the first terminals 61 and the second terminals 161 in one row is released, the second terminals 161 in the other row (the right-side row in FIG. 9) each rotate about the protruding part 164*b* of the second terminal 161 engaging with the protruding parts 67*b* of the corresponding first terminals 61 (in the clockwise direction in the example illustrated in FIG. 9). At this time, the part of the second terminal 161 where the first contact part 165 is connected to the connection part 164 moves on an arc about the protruding part 164*b* while being pressed against the first contact part 65*a* protruding toward the second contact part 66 in the first terminal 61, but includes the inclined part 164*a* that forms a relatively long straight line or loose curve, and thus can smoothly move without being subjected to a large resistance. Accordingly, the coupling of the first terminals 61 and the second terminals 161 in the other row may be released by simply applying a weaker force than the coupling of the first terminals 61 and the second terminals 161 in the one row.

In other words, the magnitude of the force required to release the coupling between the first connector 1 and the second connector 101 has a first peak present when releasing the coupling between the first terminals 61 and the second terminals 161 in one row and a second peak present when releasing the coupling between the first terminals 61 and the second terminals 161. However, in the present embodiment, since the second terminal 161 includes the inclined part 164*a* that forms a relatively long straight line or loose curve, the second peak is lower. Accordingly, mating of the first connector 1 with the second connector 101 may be easily released.

As described above, in the present embodiment, the first connector 1 includes the first housing 11, the first terminals 61 attached to the first housing 11, and the first reinforcing bracket 51 attached to the first housing 11. The first housing 11 includes the first protruding end parts 21 which are formed on both ends in the longitudinal direction and have the mating recesses 22 into which the second protruding end parts 122 formed on both ends in the longitudinal direction of the second housing 111 of the second connector 101 are inserted. The first reinforcing bracket 51 includes the end wall cover part 57 which extends in the width direction of the first housing 11 and is attached to the end wall part 21*b* of the first protruding end part 21, and the pair of left and right connection arms 53 that are connected to both ends of the end wall cover part 57 and extend toward the longitudinal center of the first housing 11, and the connection arm 53 includes the side plate part which extends in the mating direction, and the side wall upper cover part 53*a* connected to the upper end of the side plate part 53*b*. At least a part of the outside of the side plate part 53*b* is covered with the side wall extension outer part 21*c*1 of the side wall extension 21*c*, and the side wall upper cover part 53*a* curves such that the tip 53*e* faces the inside of the mating recess 22 and covers at least a part of the upper surface of the side wall extension inner part 21*c*2 of the side wall extension 21*c*.

Therefore, the side wall extension 21*c* is integrated with the side plate part 53*b* and has a high strength although it is thin, and thus, even when subjected to a large pressing force from the second connector 101 during the mating operation, the first protruding end part 21 is not damaged or broken. Therefore, the protected state of the first housing 11 is maintained with certainty, and the reliability is enhanced.

In addition, the side plate part 53*b* includes the through-hole 53*d*, and the side wall extension outer part 21*c*1 and the side wall extension inner part 21*c*2 of the side wall extension 21*c* are connected to each other through the through-hole 53*d*. Thus, the side wall extension 21*c* is firmly integrated with the side plate part 53*b*.

Furthermore, the upper surface of the side wall extension outer part 21*c*1 of the side wall extension 21*c* is located lower than the upper end of the side wall upper cover part 53*a*. Accordingly, the side wall extension outer part 21*c*1 is not subjected to a large pressing force from the second connector 101 during the mating operation, and is not damaged or broken.

Furthermore, the lower end surface 53*c* of the side plate part 53*b* is exposed below the side wall extension 21*c*, and can come into contact with the surface of the first circuit board on which the connector 1 is mounted. As a result, the strength of the integrated side wall extension 21*c* and side plate part 53*b* is further improved.

Furthermore, the first reinforcing bracket 51 includes a bottom surface cover part 58 which covers the bottom surface of the mating recess 22, and the pair of left and right contact arm parts 54 that are connected to both left and right sides of the bottom surface cover part 58, and are capable of coming into contact with the second reinforcing bracket 151 attached to the second protruding end part 122 inserted into the mating recess 22. The contact arm parts 54 each include the spring part 54*a* that is elastically displaceable in the width direction of the first housing 11, and the contact projection 54*b* that is connected to the free end of the spring part 54*a* and protrudes in the width direction of the first housing 11. As a result, the conducting state between the first reinforcing bracket 51 and the second reinforcing bracket 151 may be reliably maintained.

Furthermore, the tip 54*c* of the upper half of the contact projection 54*b* extends diagonally upward in the width direction of the first housing 11, and the tip 54*c* is opposed proximate to the tip 53*e* of the side wall upper cover part 53*a* and located below the tip 53*e* of the side wall upper cover part 53*a*. This prevents a large pressing force from acting on the contact arm part 54 from the second connector 101, thereby preventing buckling of the spring part 54*a*.

Note that the disclosure of the present specification describes characteristics related to a preferred and exemplary embodiment. Various other embodiments, modifications, and variations within the scope and spirit of the claims appended hereto could naturally be conceived of by persons skilled in the art by summarizing the disclosures of the present specification.

The present disclosure is applicable to a connector and a connector assembly.

The invention claimed is:

1. A connector comprising:

a connector body including first and second mating guide parts formed on opposite longitudinal ends thereof, each mating guide part having side wall parts coupled together by an end wall part which define a mating recess, the mating recesses being configured to receive counterpart mating guide parts formed at opposite longitudinal ends of a counterpart connector body of a counterpart connector, each side wall part defining a slit-shaped intermediate recess, wherein an inner part of the respective side wall part extends along an inner side of the respective slit-shaped intermediate recess and is proximate to the respective mating recess and an outer part of the respective side wall part extends along an outer side of the respective slit-shaped intermediate recess;

a reinforcing bracket attached to the first mating guide part, the reinforcing bracket including a bottom surface part covering a bottom surface of the mating recess of the first mating guide part, an end wall cover part extending from an end of the bottom surface part, first and second connection arms having first ends extending from opposite sides of the end wall cover part and opposite second ends, wherein a length of each connection arm is defined between the opposite ends thereof, a side plate part having a first end extending from the respective connection arm and an opposite second end, and a side wall upper cover part extending from an upper end of the respective side plate part, each side plate part extending at least partially through the slit-shaped intermediate recess of the respective side wall part and the respective side wall upper cover part extending over the respective inner part of the side wall part and is exposed above the respective side wall part of the first mating guide part, wherein a length of each side plate part is defined between the opposite ends thereof, and each side wall upper cover part has opposite first and second free ends defining a length therebetween and a linearly extending inner free end which extends continuously between the first and second free ends, the first free ends of the side wall upper cover parts being aligned with the first ends of the respective side plate part and the second free ends of the side wall upper cover parts being aligned with the second ends of the respective side plate part, and wherein the lengths of the side plate parts are longer than the lengths of the respective connection arms; and a terminal attached to the connector body.

2. The connector according to claim 1, wherein each side plate part of the first mating guide part includes a through-hole, and each side wall part of the first mating guide part further includes a wall part therein which is within the through-hole and which connects the outer part of the side wall part of the first mating guide part and the inner part of the respective side wall part of the first mating guide part.

3. The connector according to claim 1, wherein a lower end of each side plate part is exposed below each respective side wall part of the first mating guide part.

4. The connector according to claim 1, further comprising a second reinforcing bracket attached to the second mating guide part.

5. The connector according to claim 2, wherein all of the wall parts of the connector body are integrally formed.

6. The connector according to claim 1, wherein the inner free ends of the side wall upper parts extend into the mating recess of the first mating guide part.

7. The connector according to claim 1, wherein all of the wall parts of the connector body are integrally formed.

8. The connector according to claim 1, further comprising a second reinforcing bracket attached to the second mating guide part.

9. The connector according to claim 8, further comprising a counterpart connector having counterpart mating guide parts formed at opposite longitudinal ends of a counterpart connector body thereof which are configured to be received within the mating recesses.

10. The connector according to claim 1, further comprising a counterpart connector having counterpart mating guide parts formed at opposite longitudinal ends of a counterpart connector body thereof which are configured to be received within the mating recesses.

11. The connector according to claim 1, wherein the reinforcing bracket further includes first and second contact arm parts connected to both sides of the bottom surface cover part and extending below the inner free end of the respective side wall upper cover part, the contact arm parts being configured to come into contact with a counterpart reinforcing bracket attached to the counterpart mating guide parts received by the mating recesses, and the contact arm parts each include a spring part that is elastically displaceable in the width direction of the connector body, and a contact projection connected to a free end of the spring part, the contact projection protruding in the width direction of the connector body.

12. The connector according to claim 11, wherein an upper half of each contact projection extends such that a tip thereof faces diagonally upward toward the outside in the width direction of the connector body, and the respective tip is opposed proximate to a tip of the side wall upper cover part and located below the tip of the side wall upper cover part.

13. The connector according to claim 11, in combination with a counterpart connector which mates therewith.

14. The connector according to claim 2, further comprising a counterpart connector having counterpart mating guide parts formed at opposite longitudinal ends of a counterpart connector body thereof which are configured to be received within the mating recesses.

15. A connector comprising:

a connector body including first and second mating guide parts formed on opposite longitudinal ends thereof, each mating guide part having side wall parts coupled together by an end wall part which define a mating recess, the mating recesses being configured to receive counterpart mating guide parts formed at opposite longitudinal ends of a counterpart connector body of a counterpart connector;

a reinforcing bracket attached to the first mating guide part, the reinforcing bracket including a bottom surface part covering a bottom surface of the mating recess of the first mating guide part, an end wall cover part extending from an end of the bottom surface part, first and second connection arms having first ends extending from opposite sides of the end wall cover part and opposite second ends, wherein a length of each connection arm is defined between the opposite ends thereof, a side plate part having a first end extending from the respective connection arm and an opposite second end, and a side wall upper cover part extending from an upper end of the respective side plate part, the respective side wall upper cover part extending over the inner part of the respective side wall part and is exposed above the respective side wall part of the first mating guide part, wherein a length of each side plate part is defined between the opposite ends thereof, and each side wall upper cover part has opposite first and second free ends defining a length therebetween and a linearly extending inner free end which extends continuously between the first and second free ends, the first free ends of the side wall upper cover parts being aligned with the first ends of the respective side plate part and the second free ends of the side wall upper cover parts being aligned with the second ends of the respective side plate part, and wherein the lengths of the side plate parts are longer than the lengths of the respective connection arms; and a terminal attached to the connector body.

16. The connector according to claim 15, further comprising a second reinforcing bracket attached to the second mating guide part.

17. The connector according to claim 15, wherein each side plate part of the first mating guide part includes a through-hole, and each side wall part of the first mating guide part further includes a wall part therein which is within the through-hole and which connects the outer part of the side wall part of the first mating guide part and the inner part of the respective side wall part of the first mating guide part.

18. The connector according to claim 15, further comprising a counterpart connector having counterpart mating guide parts formed at opposite longitudinal ends of a counterpart connector body thereof which are configured to be received within the mating recesses.

19. The connector according to claim 15, wherein the reinforcing bracket further includes first and second contact arm parts connected to both sides of the bottom surface cover part and extending below the inner free end of the respective side wall upper cover part, the contact arm parts being configured to come into contact with a counterpart reinforcing bracket attached to the counterpart mating guide parts received by the mating recesses, and the contact arm parts each include a spring part that is elastically displaceable in the width direction of the connector body, and a contact projection connected to a free end of the spring part, the contact projection protruding in the width direction of the connector body.

20. The connector according to claim 19, in combination with a counterpart connector which mates therewith.

* * * * *